No. 609,610. Patented Aug. 23, 1898.
C. W. DAVIS.
CULTIVATOR AND SOIL STIRRING IMPLEMENT.
(Application filed Feb. 10, 1897.)
(No Model.)  5 Sheets—Sheet 1.
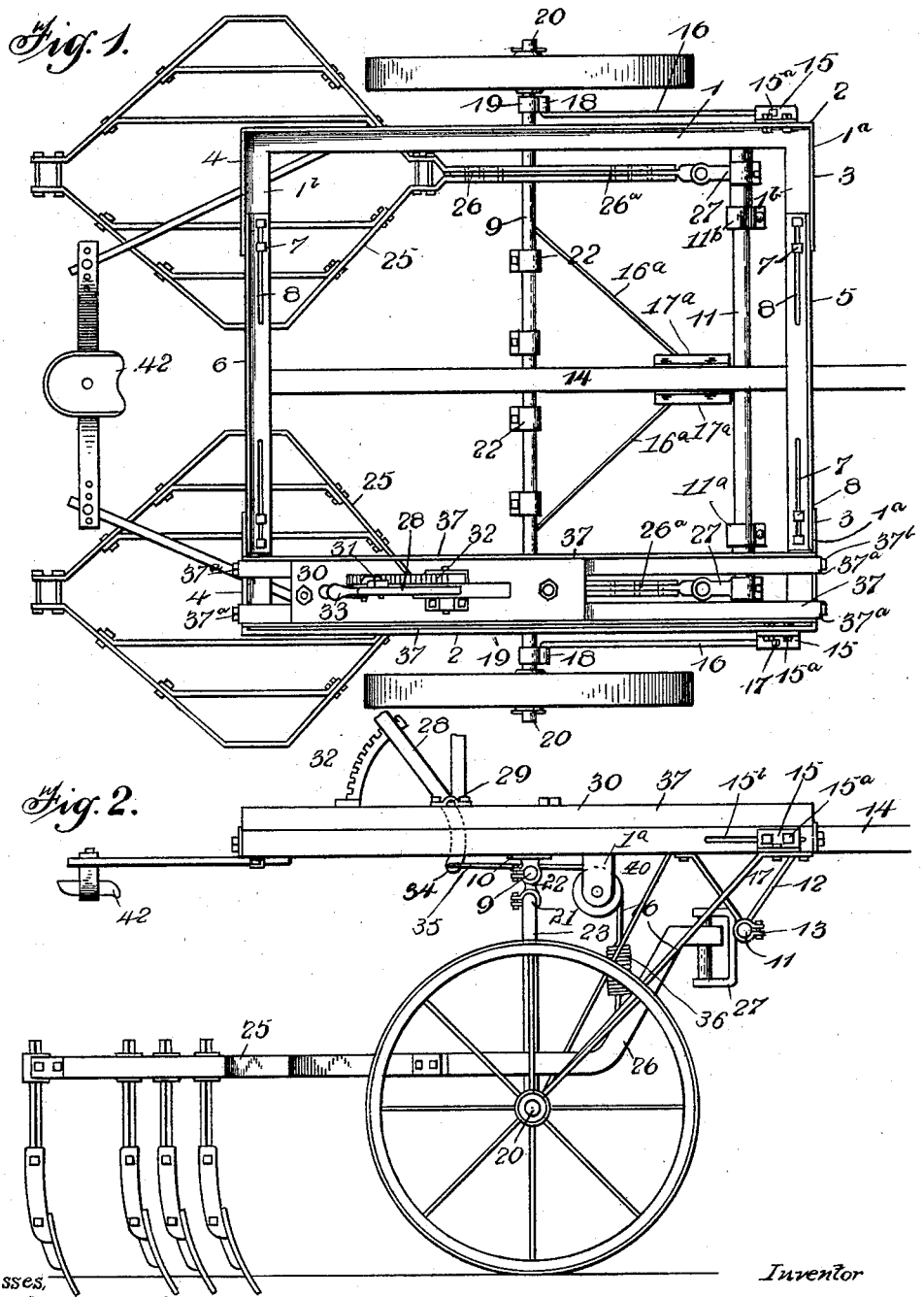
Witnesses,
W. F. Doyle.
Herbert Bradley
Inventor
Charles Wood Davis,
By Knight Bros
Attys

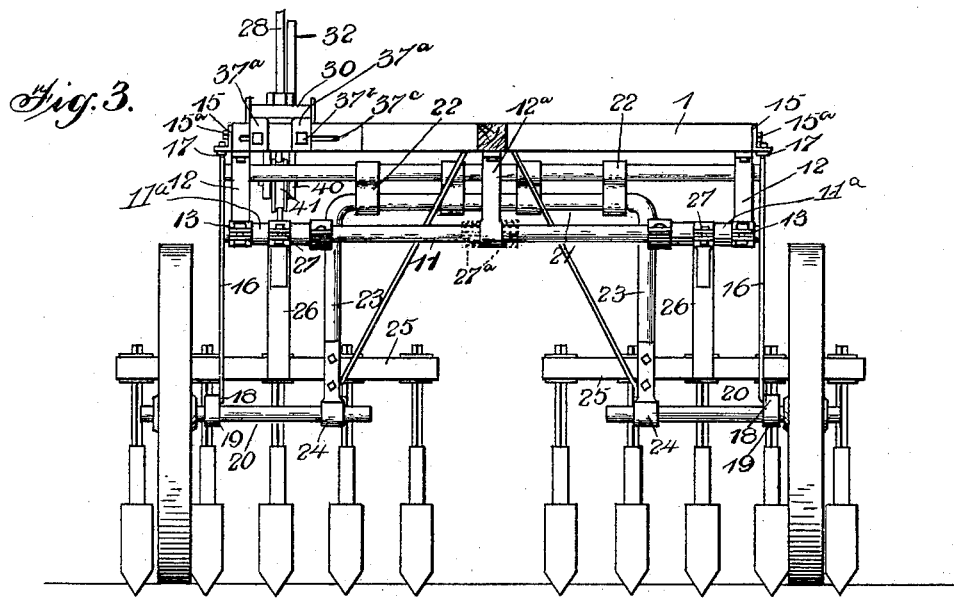

No. 609,610. Patented Aug. 23, 1898.
C. W. DAVIS.
CULTIVATOR AND SOIL STIRRING IMPLEMENT.
(Application filed Feb. 10, 1897.)
(No Model.) 5 Sheets—Sheet 3.

Witnesses
Wm F. Doyle.
Herbert Bradley.

Inventor
Charles Wood Davis,
By Knight Bros
Attys.

THE NORRIS PETERS CO., PHOTO-LITHO., WASHINGTON, D. C.

No. 609,610. Patented Aug. 23, 1898.
C. W. DAVIS.
CULTIVATOR AND SOIL STIRRING IMPLEMENT.
(Application filed Feb. 10, 1897.)

(No Model.) 5 Sheets—Sheet 4.

Witnesses:
Wm F. Doyle
Herbert Bradley

Inventor
Charles Wood Davis
By Knight Bros
Attys.

No. 609,610. Patented Aug. 23, 1898.
C. W. DAVIS.
CULTIVATOR AND SOIL STIRRING IMPLEMENT.
(Application filed Feb. 10, 1897.)
(No Model.) 5 Sheets—Sheet 5.
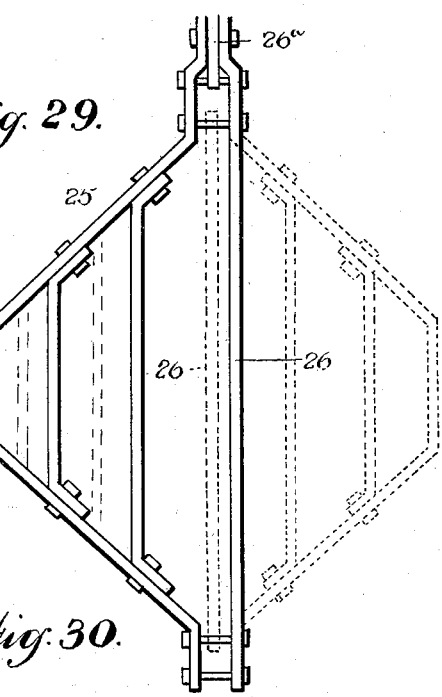
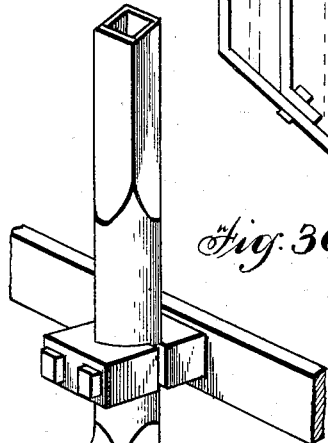
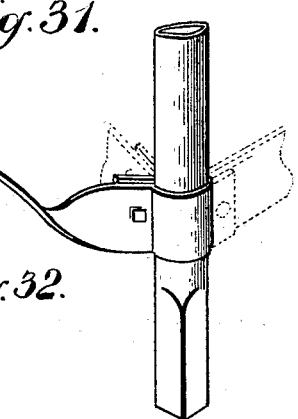
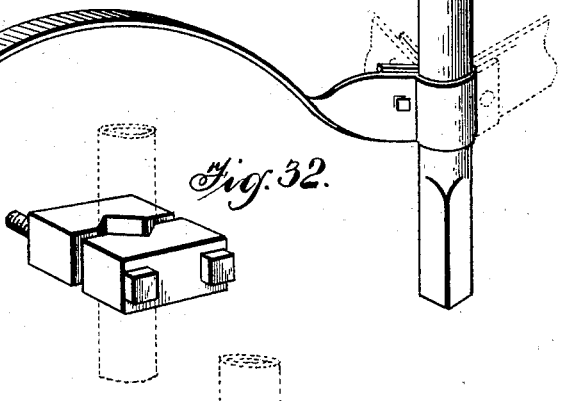
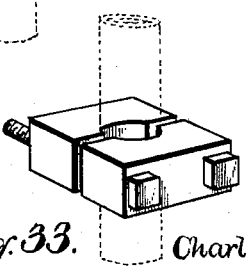
Witnesses
W. F. Doyle.
Herbert Bradley.
Inventor
Charles Wood Davis.
Knight Bros
Attorney

UNITED STATES PATENT OFFICE.

CHARLES WOOD DAVIS, OF NEAR PEOTONE, KANSAS.

CULTIVATOR AND SOIL-STIRRING IMPLEMENT.

SPECIFICATION forming part of Letters Patent No. 609,610, dated August 23, 1898.

Application filed February 10, 1897. Serial No. 622,808. (No model.)

*To all whom it may concern:*

Be it known that I, CHARLES WOOD DAVIS, a citizen of the United States, residing near Peotone, Viola township, Sedgwick county, State of Kansas, have invented certain new and useful Improvements in Cultivators and Soil-Stirring Implements, of which the following is a specification.

My invention relates to an implement constructed for cultivating the spaces between rows of growing plants, or it is convertible for the purpose of stirring the surface generally.

My invention consists in certain novel features of construction which will hereinafter be fully described, and particularly pointed out in the claims.

Figure 24:
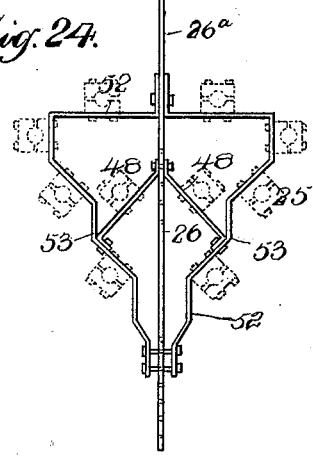
Figure 25:
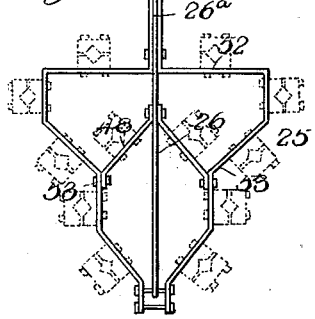

In the accompanying drawings, Figure 1 is a plan of an implement constructed in accordance with my invention, and Figs. 2 and 3 are, respectively, a side elevation and a front view of the same. Figs. 4, 5, and 5ª are detail views of the connections for coupling the gang-frames to the draw-head, Fig. 5ª being a view corresponding to Fig. 5, showing a modified construction for coupling an intermediate gang-frame to the middle of the draw-head, where the latter is also engaged by a supporting-hanger. Fig. 6 is a detail of one of the supporting-hangers employed for mounting the draw-head beneath the main frame. Fig. 7 is a detail of the collar by which the arch-bar is secured beneath the main frame. Fig. 8 represents one of the twin collars by means of which the arch is mounted beneath the arch-bar, Fig. 8ª being a similar view of a collar which is employed for connecting a brace-rod to an axle or other round part. Figs. 9 and 10 are enlarged detail views of an elevating mechanism employed for relieving the soil-stirring devices of any desired portion of the weight of the gang-frame and parts carried thereby or for lifting said gang-frame out of operative position when not in use. Figs. 11 and 11ª represent detail views of an improved form of spring-tooth which is adapted to be clamped upon a common form of shank either above or below the border or bar of the gang-frame. Figs. 12 to 17, inclusive, represent a series of embodiments of certain novel features in the construction of gang-frames. Figs. 18 to 23, inclusive, represent a series of embodiments of some of the novel features illustrated in Figs. 12 to 17, together with some other features of novelty in the construction of gang-frames. Figs. 24 and 25 represent further modifications in the construction of gang-frames embodying still further novel features. Figs. 26, 27, 28, and 29 are detail views illustrating still further modifications. Fig. 30 is a detail perspective view showing means for securing a shovel to the side of a gang-frame. Fig. 31 is a detail perspective view showing a spring-tooth provided with an adjustable point. Fig. 32 is a perspective view of tooth-attaching blocks. Fig. 33 is a perspective view showing a modification of the same.

One feature of my present invention is a main frame 1, made laterally adjustable in size and for this purpose preferably constructed of side members 2, having end projections 3 4 and overlapping ends 5 6. These parts are preferably constructed of angle-iron, having a vertical flange 1ª, projecting from the outer edge, and inwardly-projecting horizontal flange 1ᵇ. The projections 3 4 and the overlapping end pieces 5 6 are made relatively movable and clamped together by means of bolts 7, passing through perforations in one of the parts, and slots 8, formed in the other of said parts at each joint. For convenience the perforations are in the horizontal flanges of the end projections, while the slots are formed in the horizontal flanges of the overlapping end pieces. This order may obviously be reversed.

Another feature of my present invention consists in mounting an arch-bar 9 beneath the movable portions of the main frame 1 by laterally-adjustable means and beneath the fixed draft-tongue 14, said arch-bar being conveniently secured by means of the collars 10. (Illustrated in Fig. 7.)

A further feature consists in fixing beneath the overlapping front end 5 and draft-tongue 14 a bar or rod 11, preferably tubular, with rotating sleeves and confining-collars, which I term a "draw-head," and adjustably securing said draw-head beneath the laterally-adjustable sides of the frame by means of hangers 12, having clamping-collars 13. Such a hanger is preferably used also beneath the draft-tongue 14. When it is desired to adjust the width of the main frame, the clamps of the two outer hangers and the clamps of the two outer supporting-collars 10 are all loosened, while the collar 10 and the hanger 12 beneath the draft-tongue remain tight and respectively hold the arch-bar 9 and the draw-head 11 while the sides are adjusted.

A further feature consists in mounting upon the sides of the frames attaching-plates 15, adjustably secured by bolts 15$^a$, which enter slots 15$^b$ in the vertical flanges 1$^a$, while brace-rods 16 are pivoted at 17 in said attaching-plates and extend downwardly and rearwardly and are bent so as to enter and be pivotally secured in sockets 18, formed in brace-collars 19, mounted on the respective parts of the axle 20. Brace-rods 16$^a$ also extend from swiveled connections with the lower portions of the arms of the arch 23 to pivoted connections with slotted plates 17$^a$, which are secured in a manner permitting independent adjustment of each of said rods. The axles or parts of axle 20 are mounted in the arch 21, which is secured by twin collars 22 to the arch-bar 9 heretofore referred to. Obviously the axle may be continuous instead of divided. Each side 23 of the arch is provided with an axle-clip 24 at its lower end, in which the axle is adjustably mounted. The axle-spindles are also interchangeable with additional spindles of other lengths to provide means for widening the scope of the implement for working stubbles, fallows, and orchards, which may be done by such interchange of axles and the concurrent attachment to sides of gang-frames of supplementary frames, as provided for in my application, Serial No. 622,807, filed February 10, 1897, or by interposing an additional gang-frame, as provided for herein. Axles are removable and replaceable with others of other lengths. 25 represents the gang-frames, constructed with draw-bars 26, connected through the medium of pivoting-stirrups 27 to the draw-head 11.

A further feature consists in mounting draw-bars 26 above the axles 20 and either inside or outside the arch and permitting said axles to project or to be adjusted inward or outward without interfering with the raising of the gang-frames. The connection between the draw-bar 26 and the stirrup 27 and the construction of said stirrup, as illustrated in detail in Figs. 4 and 5, are set forth in previous applications filed by me, and such parts need not be described here further than to state that the stirrup may swing freely upon the draw-head 11 while it is clamped to sleeve 11$^a$, confined laterally thereon by means of adjustable collars 11$^b$, and the draw-bar 26 may swing laterally on the stirrup while it is confined vertically therein by the bifurcated connecting part 26.

A further feature consists in providing for interposing an additional gang-frame between the two side gang-frames (see dotted lines, Fig. 3) for use in fallow working or harrowing or other working where the entire surface is to be stirred by using a stirrup 27$^a$, (shown in Fig. 5$^a$,) which is similar in construction to the stirrup 27, except that it has bifurcated clamping ends 27$^b$, by which it is secured to sleeves 11$^a$, mounted rotatively on the transverse bar of the draw-head 11 on opposite sides of the hanger 12$^a$, as shown by dotted lines in Fig. 3.

A further feature consists in elevating mechanisms comprising a lever 28, fulcrumed at 29 upon base-plate 30 and having a dog 31 engaging in a segment-rack 32, also carried by said plate, to hold the lever to adjustment, said dog being controlled by the usual grip 33. Said lever has lifting connection at its lower end 34, through flexible connection 35 and interposed spring 36, with the gang-frame 25. It will be understood there is one of these elevating mechanisms, which are best shown in Figs. 9 and 10, for each side of the machine, although I have shown and described but one of them.

A further feature consists in mounting the base-plate 30 between the angle-irons 37, resting upon the vertical flanges 1$^a$ of extensions 3 of the main frame and suitably spaced apart to receive the base-plate 30 between the vertical flanges 37$^a$ of said angle-iron, which base-plate is then adjustably secured by means of cross-plates 38, which overlap the horizontal flanges of the angle-iron, and bolts 39, which clamp said plates 38 and base-plates 30 rigidly in position. These clamping connections may readily be loosened to permit the base-plate 30 and all the parts carried by it to be adjusted backward or forward on the main frame. 40 is a hanger formed integral with one of the plates 38 or otherwise suitably secured to the base-plate 30 and carrying a sheave 41, over which the flexible connection 35 passes. The interposed spring 36 is of sufficient strength to lift the whole load of a gang-frame or any part of said load, according to the extent to which said spring is stretched. The axis of the sheave 41 determines the point at which the load of the gang-frame is imposed upon the main frame. Therefore by shifting the base-plate 30 backward or forward, together with the parts carried by it, the position of this load may be shifted at will. This enables me to distribute the combined load of the rider, who occupies seat 42, and of the gang-frame over the implement at will and to balance said load over the axles, if desired.

From so much of the description it will be observed that the elevating mechanism is carried upon the adjustable sides of the main frame. If, therefore, it is desired to adjust the width of the implement and the position of the gang-frames to adapt the implement to different widths of row-spaces, the collars holding the parts of the arch and the bolts which hold the parts of the main frame together are loosened and the parts of the implement moved in and out at will until the required adjustment is obtained, after which the different securing parts are again tightened. Although this ordinarily requires no lateral adjustment of the elevating mechanism, yet such mechanism is adapted to adjustment both laterally and longitudinally.

In order that the angle-irons 37 may not interfere with the adjustment 7 8 of the main frame, said angle-irons rest upon the vertical flanges 1ª of the main frame and are there secured by downturned ends 37ª of said angle-iron, through which pass bolts 37ᵇ, which enter slots 37ᶜ in the vertical flanges 1ª, (see Fig. 3,) and thus adapt said angle-irons 37 to be adjusted when desired. As they are practically clamped together by the mounting for the elevating mechanism or may be otherwise spaced apart the two bars may be readily adjusted simultaneously.

I have shown mounted in the gang-frames in the general views of the implement shovels of known construction; but I desire it understood that the implement is adapted to receive soil-stirring parts, whether shovels, spring-teeth, or other forms.

A further feature of my invention consists in a new form of spring-tooth, as shown in Fig. 11, and which consists in a curved flat metal tooth 43, having its upper end twisted into a position at right angles to the body of the tooth and then bent to form an open socket 44, which is adapted to receive a shank 45 and be clamped thereon by screw 46. Such spring-tooth may have a removable point, as shown in Fig. 31. Shank 45 may correspond in section with the ordinary square or other form of straight shank and is therefore applicable in any place where a straight-shank shovel may be used. The tooth is applicable to the shank either above or below the gang-frame. I do not limit myself, however, to the use of such a tooth with a straight shank, as it is obvious that the socket 44 formed on the tooth might be made to clamp some part of the frame. This construction and method of attaching a spring-tooth is more fully illustrated in Fig. 31, where such a tooth is shown to be adapted to adjustment both horizontally and vertically in a novel and very useful manner, which enables the workman operating the implement to move earth to or from a row of plants, as may be deemed desirable.

Figure 12:
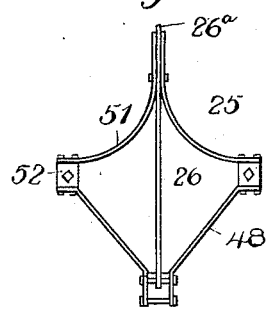
Figure 13:
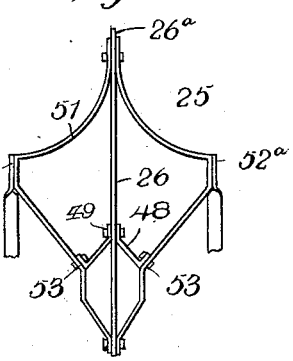
Figure 14:
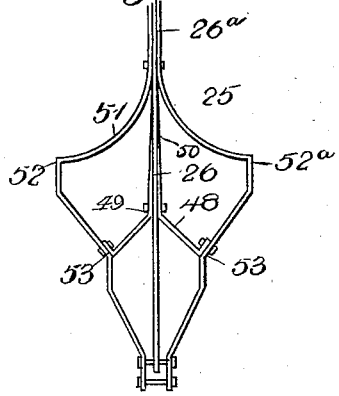
Figure 15:
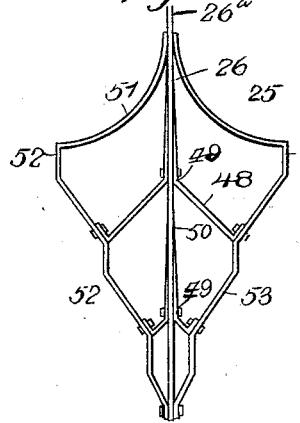
Figure 16:
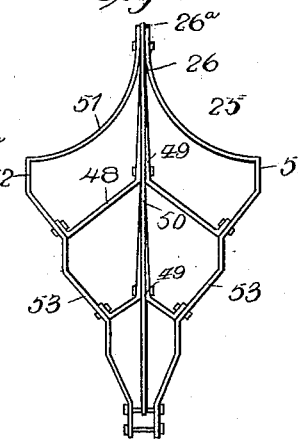
Figure 17:
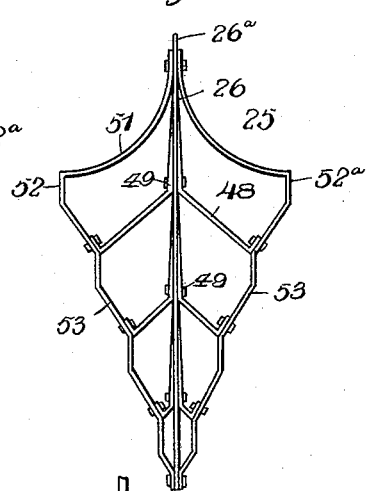
Figure 26:
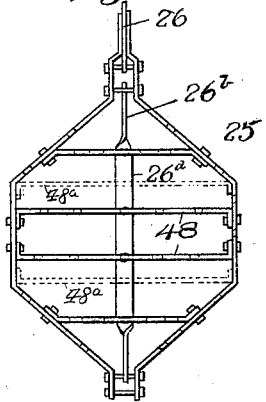

Further features of my invention relate to the construction of gang-frames. In Figs. 12 to 28 I have shown various forms of gang-frames, in all of which common principles of construction are embodied. One principle which runs through all of these forms is the use of a continuous or substantially continuous drag-bar 26, whereby the sides or border of the frames are greatly relieved from strain and intermediate bars 48 when arranged transversely or at an angle are additionally supported and braced. In all of these forms excepting in Figs. 26, 27, and 28 it will be seen that an extension 26ª of the drag-bar 26 forms a continuous longitudinal bar through the frame, while in Figs. 26, 27, and 28 said drag-bar is practically continuous, an extension 26ᵇ being secured between the two ends in Fig. 26 and an offset 26ᶜ, which forms one side of a half-frame, being employed in Figs. 27 and 28. In Figs. 14 to 25 and in Fig. 28 the transverse or angularly-arranged intermediate bars 48 are bolted at 49 to the extension 26ª or continuation of the drag-bar and provided with tapering ends 50, which pass forward beneath the next joint 49. In Fig. 26 the extension 26ᵇ is not, but may be, bolted to the intermediate bars 48, but assists in either case in supporting them, said extension 26ᵇ being for this purpose twisted at its middle portion, so as to present the flat portion 26ᵈ beneath the transverse bars to support them.

A further feature common to forms of gang-frames shown in Figs. 1, 26, 27, 28, and 29 is the removability and interchangeability of intermediate bars, whereby additional shovels or soil-stirring devices may be added or removed at will. This is illustrated by the additional or substitute bars 48ª shown in dotted lines in Fig. 26, while by the use of bolts in the other figures it is obvious that any of the bars may be removed at will. In addition to the feature of removability or interchangeability the feature of adjustability of the bars is common to Figs. 26, 27, 28, and 29, as indicated by dotted lines in said figures.

In Figs. 12 to 25 is illustrated the use of angularly-arranged front and intermediate bars, whereby the dragging force is transmitted from the longitudinal bar 26ª to the sides in a direction which prevents undue strain being placed on the sides. The intermediate bars 48 and front bars 51 are intended to extend to points or adjacent to points 52 52ª, where the shovels or other soil-stirring devices are located. This is illustrated in Figs. 12, 13, 18, and 21.

A further feature which is common to Figs. 12 to 23 is the preferable use of dished or curved front bars 51. This permits the gang-frame to be drawn farther forward beneath the main frame of the implement and closer to the wheels, while retaining the adaptability of the gang-frames to be deflected for passing obstructions or plants out of line.

A further feature which may be common to all the designs of gang-frames is the extensibility of the drag-bar 26. This is illustrated only in Fig. 24; but it is obvious that the same feature is adapted to any of the forms.

A further feature which is common to Figs. 13 to 17, inclusive, and Figs. 24 and 25 is the arching of the sides or forming angles 53 therein at the points where the intermediate bars are attached. This has the effect of greatly strengthening the frame and permitting it to be made of lighter material, in addition to providing straight longitudinal portions 52 in the frame for convenience in attaching soil-stirring devices.

Figure 21:
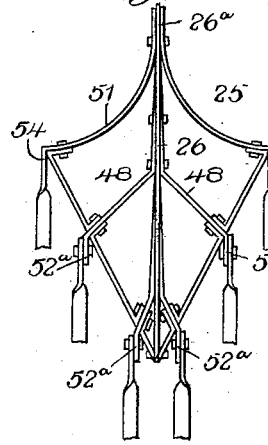
Figure 22:
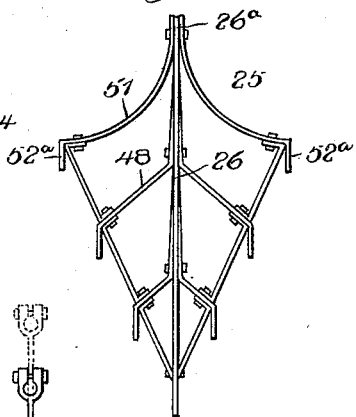
Figure 23:
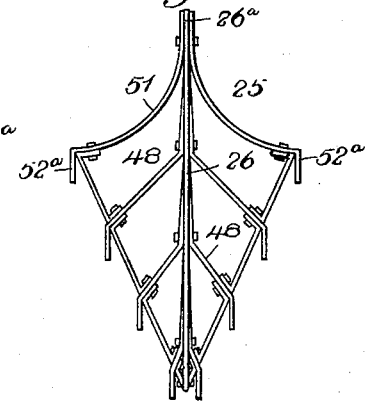

A further feature shown applied to Figs. 18 to 23 is the use of extensions on the end and intermediate bars to form longitudinal terminals 52ª for the attachment of the shovels or other soil-stirring devices. This feature is, however, applicable to other forms than those to which it is shown applied. This last-named feature also adapts the frame to be made with integral teeth 54, as shown in Fig. 21, or to have the teeth bolted thereto, as shown in the same figure.

Figure 27:
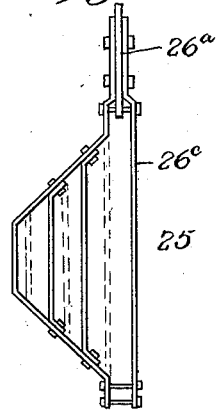
Figure 28:
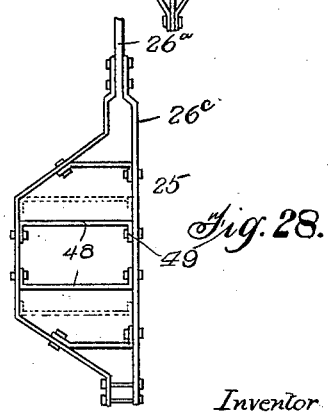
Figure 18:
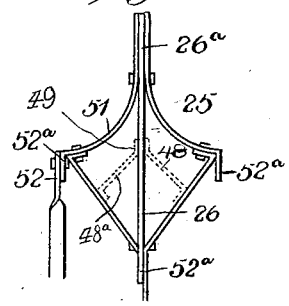
Figure 19:
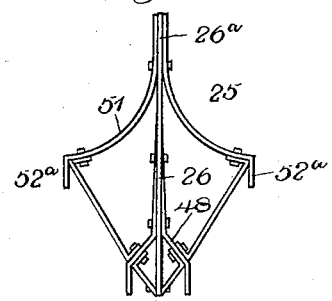
Figure 20:
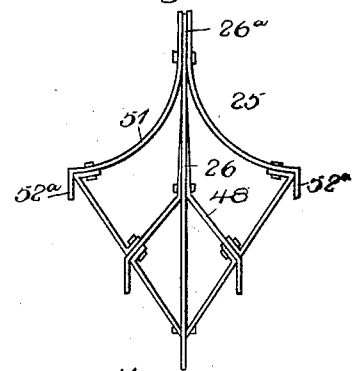

A further feature consists in constructing the gang-frame, as shown in Figs. 27 and 28, so that it extends on one side only of the line of the drag-bar 26 or extensions 26ᶜ. This adapts the gang-frames for working close together in the tillage of half-row spaces, as is the method with ordinary cultivators.

In Fig. 26 is illustrated a gang-frame having intermediate transverse bars, of which the central ones are removable as well as shiftable, while those disposed in the tapering portions of the frame are interchangeable with additional bars adapted to fit at other points in said portions, thereby adapting this form of gang-frame to receive soil-stirring parts in a great number of adjustable positions and fitting it for a great variety of work, as said parts may be attached to all parts of the frame, as indicated by perforations.

In Fig. 29 the form of gang-frame illustrated in Fig. 1 is shown with one half removed, the remaining portion being thereby adapted to the cultivation of half-row spaces, as with ordinary straddle-row cultivators, it being sometimes desirable to thus convert an implement adapted to the simultaneous cultivation of two entire-row spaces.

It will be observed that any frame which I have illustrated may be attached to the wheeled draft portion of my improved implement, and said frames may be employed interchangeably for different purposes.

It will also be observed that while I have illustrated various embodiments of the different novel features of gang-frames said features are nevertheless adapted to be combined in all a single structure.

Having thus described my invention, the following is what I claim as new therein and desire to secure by Letters Patent:

1. In a cultivator, the combination of a main frame comprising the end portions and draft-tongue fixed thereto and laterally-adjustable side portions, an arch-bar and draw-head each fixed to the intermediate portion of the main frame, and adjustably secured to the laterally-adjustable side portions of said main frame, substantially as set forth, and suitable soil-stirring devices having draft connection with the draw-head, and wheels mounted on the arch, substantially as described.

2. In an agricultural implement, the combination of the main frame having laterally-adjustable sides and a draft-tongue or equivalent centrally-disposed portion, an arch-bar secured beneath said draft-tongue or centrally-disposed portion and adjustably secured to the laterally-adjustable sides, and an arch secured beneath the arch-bar and having mountings or means for attachment of the wheels, substantially as herein explained.

3. In an agricultural implement, the combination of the main frame, the arch having downwardly-projecting ends, the axles adjustable in the lower ends of the arch, gang-frames having drag-bars located above the axles and connected with the main frame forward of the arch, substantially in the manner and for the purpose set forth.

4. In an agricultural implement, the combination of the main frame, the arch having downwardly-extending ends, the axles secured in the lower portions of said arch, the braces for securing the lower portions of said arch and the attaching-plates in which said braces are swiveled and which are secured longitudinally adjustable on the main frame, substantially as herein explained.

5. In an agricultural implement, the combination of the main frame, the draw-head secured beneath the main frame by hangers, one of which is centrally disposed, and the stirrup having a bifurcated attaching-clamp for engaging the draw-head on opposite sides of the hanger and constructed for the attachment of an intermediate gang-frame, as herein explained.

6. In an agricultural implement, the combination of a main frame, pair of angle-bars secured upon the main frame, a base-plate mounted between the angle-bars by means which permits adjustment longitudinally, an elevating mechanism mounted on said base-plate, substantially as herein explained.

7. In an agricultural implement, the combination of the main frame, the gang-frames connected with the main frame, the longitudinal bars mounted on the main frame, and the base-plate secured upon said bars and carrying elevating mechanism and a guide-sheave and movable on the bars for adjusting the sheave and elevating mechanism simultaneously as herein explained.

8. In an agricultural implement, the combination of the main frame, the gang-frame drawn by the main frame, longitudinal bars mounted on the main frame, a base-plate mounted on said bars, elevating mechanism mounted on said base-plate, a clamping-plate for securing said base-plate to the bars and carrying a guide-sheave, and a flexible connection between the elevating mechanism and the gang-frame passing over said guide-sheave, substantially as herein explained.

9. In an agricultural implement, the combination of a main frame, formed of angle-iron with upwardly-extending flange, a gang-frame drawn by said main frame, an elevating mechanism for said gang-frame, and a mounting for the elevating mechanism comprising a pair of bars resting upon the vertical flanges of the main frame and means for clamping said bars to the main frame, substantially as set forth.

10. In an agricultural implement, the combination of a main frame having laterally-adjustable sides and constructed of angle-iron and with overlapping end portions, a gang-frame drawn by said main frame, elevating mechanism, and a pair of bars upon which said elevating mechanism is mounted, and which rests upon one of the flanges of the angle-iron to avoid interference with the adjustment of the overlapping portions, substantially as herein explained.

11. In an agricultural implement, the combination of a main frame, a gang-frame drawn by said main frame, an elevating mechanism, a base-plate upon which said elevating mechanism is mounted and a pair of longitudinal bars spaced apart and clamped together by clamping-plates in connection with said baseplate and having their ends adjustably secured upon the main frame, whereby said bars are held in proper relation and adjusted simultaneously as explained.

12. In an agricultural implement, the combination of a laterally-adjustable main frame and an arch beneath said main frame carrying in its lower ends laterally-adjustable wheel-axles, and gang-frames having drag-bars extending outside the arch and above the axles and connected with the main frame, substantially as herein described.

13. A tooth or soil-stirring device for agricultural implements, comprising a curved flat metal body portion and a vertical attaching-socket formed on the upper end of the said body portion and permitting lateral and vertical adjustment of said tooth; substantially as herein described.

14. In an agricultural implement, the combination of a vertical shank and a curved metal tooth having an end portion, bent into a vertical socket which receives said shank and secures said tooth vertically and angularly adjustable on said shank; substantially as herein described.

15. In an agricultural implement, the combination of a straight vertical shank, and a spring-tooth formed with a vertical attaching-socket, engaging said shank, and means for clamping said socket to the shank, and permitting angular and vertical adjustment of the tooth on the shank, substantially as and for the purposes set forth.

16. In an agricultural implement, a gang-frame having a continuous border and a substantially continuous draw-bar constructed for attachment at one end to draft connections, and extending through the gang-frame to its rear end, for the purposes set forth.

17. In an agricultural implement, the combination of a gang-frame, having a continuous border intermediate bars for the attachment of soil-stirring devices, and a substantially continuous draw-bar extending through the gang-frame and affording support for the intermediate bars, substantially as herein explained.

18. In an agricultural implement, the combination of a gang-frame and a draw-bar extending through said gang-frame from front to rear and adjustable therein for the purpose of permitting the extension of said draw-bar on the frame; substantially as and for the purpose set forth.

19. In an agricultural implement; a gang-frame having a continuous draw-bar extending through it from front to rear and intermediate bars extending from said draw-bar to the sides of the frame; substantially as herein set forth.

20. In an agricultural implement, the combination of a gang-frame having a continuous border, a bar extending from front to rear of said frame, and angularly-arranged intermediate bars extending from said front to rear bar to the edge or border of the frame for the purpose explained.

21. In an agricultural implement, the combination of a gang-frame having a border, soil-stirring devices arranged on the border or edge of said frame, a bar extending from front to rear of said frame, and diagonally-arranged bars extending from said front to rear bar to the border or edge of the frame and connected thereto at or near the points of location of the soil-stirring devices, substantially as and for the purpose set forth.

22. In an agricultural implement, the combination of a gang-frame having a border or edge formed with angle-bends, substantially as described, a longitudinal bar extending from front to rear of said frame, and diagonal bars extending from said longitudinal bar to the points of arching in the edge or border of the frame, substantially as and for the purpose set forth.

23. In an agricultural implement, the combination of a gang-frame having a border, a longitudinal bar in said gang-frame, and diagonal bars extending from said longitudinal bar to the edge or border of the gang-frame and having terminal ends projecting beyond the same, in substantially the manner described and for the purpose set forth.

24. In a cultivator, the combination of a wheeled main frame constructed with laterally-adjustable sides, a draw-head secured to the main frame, gang-frames having adjustable draft connection with said draw-head and longitudinally adjustable thereon; and longitudinally-adjustable elevating mechanisms mounted on the shiftable parts of the main frame; substantially as and for the purposes set forth.

25. In a cultivator, the combination of a main frame, comprising ends and laterally-shiftable sides, a draft-tongue secured to said ends, an arch-bar secured beneath the tongue, and adjustably attached to the sides, an arch secured beneath the arch-bar, axles adjustably mounted in the ends of the arch and adapted for the mounting of wheels, and elevating mechanisms laterally and longitudinally adjustable on the sides and laterally adjustable with said sides, whereby they may be shifted in correspondence with adjustment of gang-frames and other parts of the implement; substantially as and for the purposes set forth.

26. In an agricultural implement; a soil-stirring tooth comprising a curved flat metal portion twisted into a plane at a right angle to an upper portion, the end of the upper portion forming a clamping-socket adapted to engage a vertically-disposed shank; substantially as and for the purposes set forth.

27. A curved flat metal tooth having its upper end provided with a vertical shank-socket, whereby the tooth is adapted to both horizontal and vertical adjustment upon the shank; substantially as and for the purposes set forth.

28. In an agricultural implement, the combination of a vertically-disposed shank and a spring-tooth formed with a vertical clamping-socket engaging said shank and permitting both horizontal and vertical adjustment of said tooth; substantially as and for the purposes set forth.

29. In a cultivator; a gang-frame comprising a border shaped to form an angular front, curved or dished, and sides converging from said front portion to a centrally-disposed point at the rear of said frame with straight longitudinal side sections interposed in said converging sides, a longitudinal bar disposed in the center of said frame from front to rear, and intermediate bars extending diagonally from said longitudinal bar to connection with the border forming said converging sides; substantially as and for the purposes set forth.

30. In an agricultural implement, the combination of a main frame having an arch formed with downwardly-extending arms carrying outwardly-extending wheel-axles, a draw-head on said main frame providing a draft connection, gang-frames extending in rear of and laterally beyond the wheels and having draw-bars extending forward above the axles and between the vertical arms of the arch and said wheels and having laterally-adjustable connection with the draw-head, and an elevating mechanism laterally adjustable on the main frame in correspondence with lateral adjustments of gang-frames; substantially as and for the purposes set forth.

31. In an agricultural implement, the combination of a main frame, a draft-tongue secured to the main frame, an arch upon which the main frame is mounted and having downwardly-extending arms, wheels mounted upon axles projecting from said arms, and gang-frames extending in the rear of and outwardly beyond said wheels and having draw-bars extending above the axles and between said arch-arms and wheels to connections with said main frame forward of said arch; substantially as and for the purposes set forth.

32. In an agricultural implement, the combination of a wheeled main frame, an arch supporting said main frame and having means for mounting wheels carrying the main frame, and gang-frames extending outwardly beyond the wheels and having draw-bars extending above the axle and forwardly between said wheels and the vertical arms of the arch to draft connections with the main frame forward of said arch; substantially as and for the purposes set forth.

CHARLES WOOD DAVIS.

In presence of—
C. R. ROCKWELL,
W. B. CLARKE.